(12) United States Patent
Mamiya et al.

(10) Patent No.: US 8,164,713 B2
(45) Date of Patent: Apr. 24, 2012

(54) LIQUID CRYSTAL DISPLAY DEVICE AND METHOD FOR DRIVING SAME

(75) Inventors: Hisashi Mamiya, Kanagawa (JP); Tsuyoshi Kamada, Kanagawa (JP)

(73) Assignee: Sony Corporation (JP)

( * ) Notice: Subject to any disclaimer, the term of this patent is extended or adjusted under 35 U.S.C. 154(b) by 337 days.

(21) Appl. No.: 12/454,702

(22) Filed: May 21, 2009

(65) Prior Publication Data

US 2009/0322992 A1     Dec. 31, 2009

(30) Foreign Application Priority Data

May 23, 2008   (JP) ................ P2008-134989

(51) Int. Cl.
*G02F 1/1335*     (2006.01)
(52) U.S. Cl. .................. 349/70; 349/68; 345/102
(58) Field of Classification Search .............. None
See application file for complete search history.

(56) References Cited

U.S. PATENT DOCUMENTS

| | | | |
|---|---|---|---|
| 7,656,383 B2 * | 2/2010 | Hedrick ............... | 345/102 |
| 2006/0284565 A1 | 12/2006 | Iida et al. | |
| 2007/0291512 A1 * | 12/2007 | Lee et al. ............ | 362/633 |
| 2009/0237348 A1 * | 9/2009 | Kitamura ............. | 345/102 |
| 2011/0133674 A1 * | 6/2011 | Yoo ................... | 315/312 |

FOREIGN PATENT DOCUMENTS

| | | |
|---|---|---|
| JP | 03127491 A | 5/1991 |
| JP | 03296018 A | 12/1991 |
| JP | 04099664 A | 3/1992 |
| JP | 04106896 A | 4/1992 |
| JP | 05082091 A | 4/1993 |
| JP | 07041502 A | 2/1995 |
| JP | 09258165 A | 10/1997 |
| JP | 2000036394 A | 2/2000 |
| JP | 2000250007 A | 9/2000 |
| JP | 2002015885 A | 1/2002 |
| JP | 2007-019004 A | 1/2007 |
| JP | 2009229540 A | 10/2009 |

OTHER PUBLICATIONS

Machine translation of JP 2000-250007, Saito, Sep. 14, 2000.*
Office Action from Japanese Application No. 2008-134989, dated Mar. 9, 2010.

* cited by examiner

*Primary Examiner* — Hemang Sanghavi
(74) *Attorney, Agent, or Firm* — Lerner, David, Littenberg, Krumholz & Mentlik, LLP

(57) ABSTRACT

Disclosed herein is a liquid crystal display device that includes a normally-black liquid crystal panel whose transmittance takes a minimum value when no voltage is applied and a cold cathode fluorescent lamp used as a light source of a backlight of the liquid crystal panel, the liquid crystal display device including a light irradiator configured to carry out light irradiation of the cold cathode fluorescent lamp in a period from device activation to first lighting of the cold cathode fluorescent lamp.

8 Claims, 3 Drawing Sheets

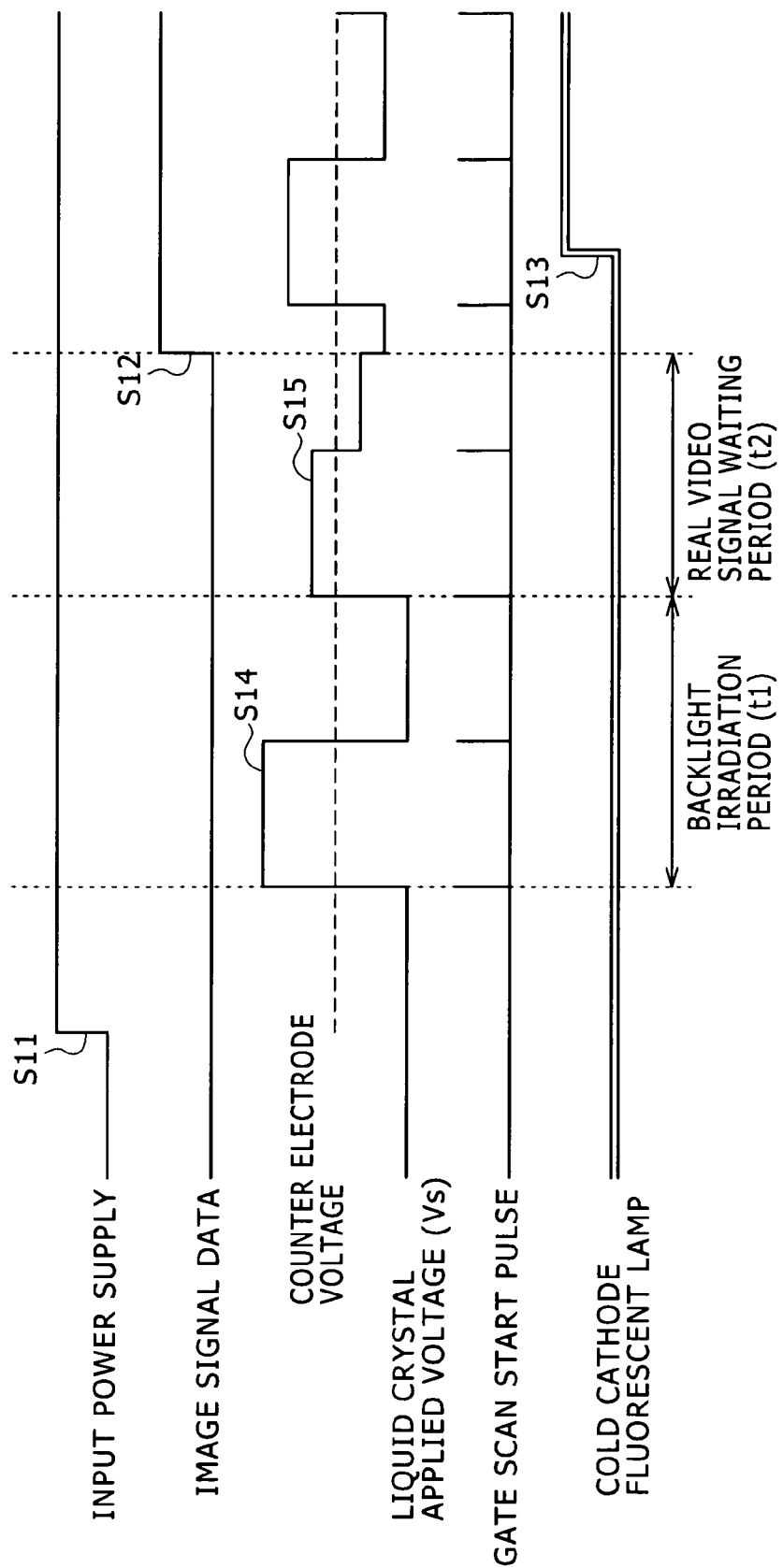

LIQUID CRYSTAL DISPLAY DEVICE AND METHOD FOR DRIVING SAME

CROSS-REFERENCE TO RELATED APPLICATIONS

The present application claims priority from Japanese Patent Application No. JP 2008-134989 filed in the Japanese Patent Office on May 23, 2008, the entire content of which is incorporated herein by reference.

BACKGROUND OF THE INVENTION

1. Field of the Invention

The present invention relates to a liquid crystal display device employing a cold cathode fluorescent lamp as the light source of its backlight and a method for driving the same.

2. Description of the Related Art

In recent years, a cold cathode fluorescent lamp (CCFL) employing a cold cathode, which is free from the necessity of heating and has a long lifetime, is widely used as the light source of a backlight in a liquid crystal display device (refer to e.g. Japanese Patent Laid-open No. 2007-19004).

SUMMARY OF THE INVENTION

The cold cathode fluorescent lamp involves a lighting delay phenomenon due to its in-dark start characteristic. The in-dark start characteristic refers to a phenomenon that, in lighting of a cold cathode fluorescent lamp under low-illuminance environment after the cold cathode fluorescent lamp has been left under dark environment for a long period, the lighting (the start of discharge) falls behind the voltage application due to a small amount of initial electrons.

Therefore, the liquid crystal display device employing the cold cathode fluorescent lamp as the light source of its backlight also involves a possibility that the lighting delay due to the in-dark start characteristic occurs at the time of the first lighting of the cold cathode fluorescent lamp unless ambient illuminance higher than a certain level can be ensured at the time of device activation after the cold cathode fluorescent lamp has been left under dark environment for a long period.

In particular, the situation in which the cold cathode fluorescent lamp is left under dark environment for a long period frequently occurs for a liquid crystal display device employing a normally-black liquid crystal panel because the optical transmittance of the normally-black liquid crystal panel takes the minimum value when no voltage is applied and the minimum value of the transmittance is getting smaller due to demand for higher contrast of displayed images in recent years. That is, in such a liquid crystal display device, the lighting delay due to the in-dark start characteristic easily occurs at the time of the first lighting of the cold cathode fluorescent lamp.

There is a need for the present invention to provide a liquid crystal display device in which lighting delay due to the in-dark start characteristic of a cold cathode fluorescent lamp does not occur even if the liquid crystal display device is activated under low-illuminance environment after the cold cathode fluorescent lamp has been left under dark environment for a long period, and a method for driving the same.

According to an embodiment of the present invention, there is provided a liquid crystal display device that includes a normally-black liquid crystal panel whose transmittance takes the minimum value when no voltage is applied and a cold cathode fluorescent lamp used as the light source of a backlight of the liquid crystal panel. The liquid crystal display device includes light irradiating means for carrying out light irradiation of the cold cathode fluorescent lamp in the period from device activation to the first lighting of the cold cathode fluorescent lamp.

In the liquid crystal display device having this configuration, the light irradiating means carries out the light irradiation of the cold cathode fluorescent lamp in the period from the device activation to the first lighting of the cold cathode fluorescent lamp. Thus, even when a situation has occurred in which the cold cathode fluorescent lamp has been left under dark environment for a long period for example, the cold cathode fluorescent lamp is irradiated with light of illuminance higher than a certain level by the time of the first lighting, and thus a problem of a small amount of initial electrons in the cold cathode fluorescent lamp is eliminated.

According to the embodiment of the present invention, even if a liquid crystal display device is activated after a cold cathode fluorescent lamp has been left under dark environment for a long period, the ambient illuminance can be increased through light irradiation of the cold cathode fluorescent lamp and thereby a problem of a small amount of initial electrons in the cold cathode fluorescent lamp can be eliminated. This can avoid the occurrence of lighting delay due to the in-dark start characteristic of the cold cathode fluorescent lamp. Therefore, the reliability in the activation of the liquid crystal display device can be enhanced compared with the case in which the lighting delay due to the in-dark start characteristic of the cold cathode fluorescent lamp occurs.

BRIEF DESCRIPTION OF THE DRAWINGS

FIG. 3 is a timing chart showing one specific example of a method for driving a liquid crystal display device according to the first embodiment of the present invention;

DETAILED DESCRIPTION

Liquid crystal display devices and methods for driving the same according to embodiments of the present invention will be described below based on the drawings.

First Embodiment

A first embodiment of the present invention will be described below.

Figure 1:
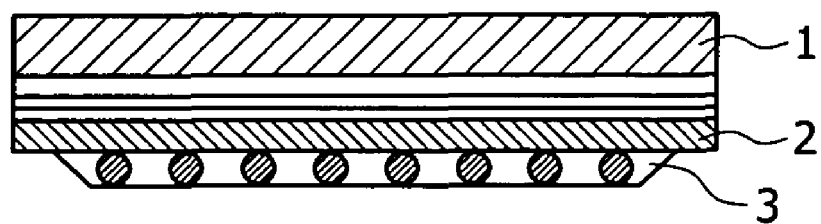
FIG. 1 is an explanatory diagram showing a schematic structural example of a liquid crystal display device according to a first embodiment of the present invention.

FIG. 1 is an explanatory diagram showing a schematic structural example of a liquid crystal display device according to the first embodiment of the present invention.

This liquid crystal display device includes a liquid crystal panel 1, a diffuser 2, a cold cathode fluorescent lamp 3, and a drive control circuit (not shown).

To obtain the liquid crystal panel 1, two transparent substrates composed of glass or the like are so disposed as to face each other, and a liquid crystal layer arising from enclosing of a liquid crystal between the substrates is provided. The optical transmittance of the liquid crystal layer changes depending on the magnitude of the applied voltage. This liquid crystal panel 1 is a normally-black one. Therefore, when no voltage is applied, the optical transmittance of the liquid crystal layer takes the minimum value and the black screen is obtained. When voltage is applied, the transmittance is increased in linkage with change in alignment in the liquid crystal layer, so that light passes through the liquid crystal layer.

Figure 2:
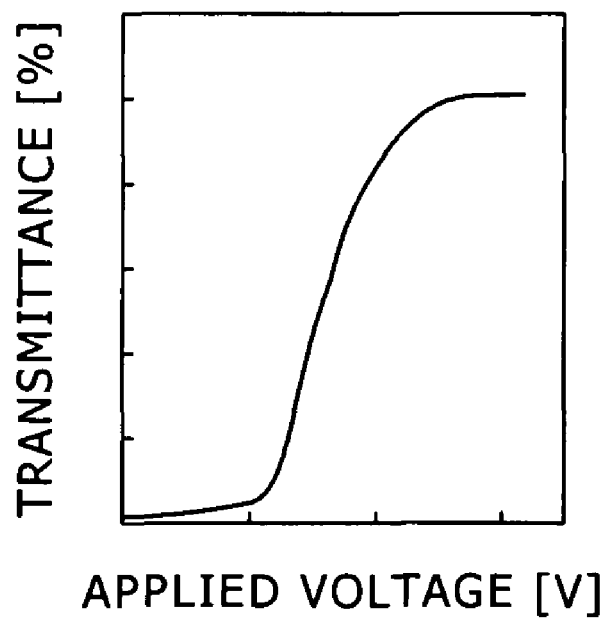
FIG. 2 is an explanatory diagram showing one specific example of the correspondence relationship between the applied voltage and the optical transmittance of a liquid crystal panel.

FIG. 2 is an explanatory diagram showing one specific example of the correspondence relationship between the applied voltage and the optical transmittance of the liquid crystal panel. As shown in FIG. 2, the transmittance takes the minimum value when no voltage is applied in the normally-black liquid crystal panel 1.

Referring back to FIG. 1, the diffuser 2 is provided between the liquid crystal panel 1 and the cold cathode fluorescent lamp 3 and is used to scatter and diffuse light from the cold cathode fluorescent lamp 3 to thereby provide uniform brightness across the entire surface of the liquid crystal panel 1.

The cold cathode fluorescent lamp 3 is used as the light source of the backlight of the liquid crystal panel 1. Specifically, electrodes are formed on both the sides of the cold cathode fluorescent lamp 3, and a noble gas is enclosed in the tube coated with a fluorescent material. When current is applied to the electrode, thermal electrons are emitted from a filament into the tube and discharge starts. The thermal electrons collide with the noble gas atoms in the tube to thereby be excited and radiate ultra-violet rays. The ultra-violet rays are absorbed by the fluorescent material applied on the tube wall to thereby emit white light to the external. Plural cold cathode fluorescent lamps 3 will be juxtaposed to each other in matching with the size of the entire surface of the liquid crystal panel 1. It is desirable to provide a reflector (not shown) on the backside of the cold cathode fluorescent lamp 3 (on the opposite side to the liquid crystal panel 1 and the diffuser 2) in order to efficiently guide light from the cold cathode fluorescent lamp 3 to the diffuser 2.

The drive control circuit is to control the driving of the liquid crystal panel 1 through control such as voltage application and signal supply to the liquid crystal panel 1. The hardware configuration of the drive control circuit can be achieved by utilizing a publicly-known technique, and therefore the detailed description thereof is omitted in the present specification.

A description will be made below about a processing operation example when the drive control circuit controls the driving of the liquid crystal panel 1 in the liquid crystal display device having the above-described configuration, i.e. about a method for driving a liquid crystal display device according to the first embodiment of the present invention.

FIG. 3 is a timing chart showing one specific example of the method for driving a liquid crystal display device according to the first embodiment of the present invention.

As shown in FIG. 3, after the liquid crystal display device is powered on to be activated (step 11, hereinafter step will be abbreviated as "S"), the drive control circuit supplies predetermined image signal data or image signal data from a higher-level device to the liquid crystal panel 1 (S12). Thereafter, the drive control circuit turns on the cold cathode fluorescent lamp 3 after the image signal data has been surely input to the liquid crystal panel 1 (S13). Through this process, the drive control circuit causes the liquid crystal display device to start image displaying.

However, the cold cathode fluorescent lamp 3 involves the lighting delay phenomenon due to its in-dark start characteristic. Furthermore, the transmittance of the liquid crystal panel 1, which is a normally-black one, takes the minimum value when no voltage is applied. Therefore, lighting delay due to the in-dark start characteristic possibly occurs at the time of the first lighting of the cold cathode fluorescent lamp 3 unless ambient illuminance higher than a certain level can be ensured at the time of the activation of the liquid crystal display device after the cold cathode fluorescent lamp 3 has been left under dark environment for a long period.

To avoid this problem, the drive control circuit ensures a period t1 for irradiation of the backlight with ambient light (hereinafter, backlight irradiation period t1) and a real video signal waiting period t2 sequentially in the period from the activation of the liquid crystal display device (S11) to the supply of the image signal data to the liquid crystal panel 1 (S12), in synchronization with a gate scan start pulse as a signal having a predetermined cycle (S14).

In the backlight irradiation period t1, the drive control circuit applies voltage to the liquid crystal panel 1 and sets the optical transmittance of the liquid crystal panel 1 to the maximum value to thereby allow ambient light to pass through the liquid crystal panel 1 and irradiate the cold cathode fluorescent lamp 3 with the light (S15). This drive control for the liquid crystal panel 1 provides the liquid crystal display device with a function as a light irradiator that carries out light irradiation of the cold cathode fluorescent lamp 3 in the period from the device activation to the first lighting of the cold cathode fluorescent lamp 3. The voltage applied to the liquid crystal panel 1 by the drive control circuit in the backlight irradiation period t1 has a voltage value sufficiently large to obtain such ambient light illuminance as to eliminate the in-dark start characteristic of the cold cathode fluorescent lamp 3. The time of the voltage application to the liquid crystal panel 1 is also a time sufficiently long to obtain such ambient light illuminance as to eliminate the in-dark start characteristic of the cold cathode fluorescent lamp 3.

After the ambient light irradiation of the cold cathode fluorescent lamp 3 in the backlight irradiation period t1, the real video signal waiting period t2 as a period for waiting image signal data starts. Specifically, in the real video signal waiting period t2, the drive control circuit applies voltage to the liquid crystal panel 1 with a voltage value smaller than that in the backlight irradiation period t1 so that the optical transmittance of the liquid crystal panel 1 may be set lower than that in the backlight irradiation period t1, to thereby provide for the subsequent supply of the image signal data to the liquid crystal panel 1.

Through the above-described drive control, the liquid crystal display device carries out processing operation to be described below.

FIGS. 4A to 4D are explanatory diagrams showing the outline of the processing operation of the liquid crystal display device driven based on the method for driving a liquid crystal display device according to the first embodiment of the present invention.

Figure 4A:
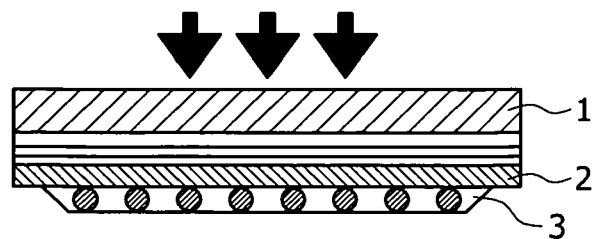
FIGS. 4A to 4D are explanatory diagrams showing the outline of the processing operation of a liquid crystal display device driven based on the method for driving a liquid crystal display device according to the first embodiment of the present invention.

As shown in FIG. 4A, before activation of the liquid crystal display device, no voltage is applied to the liquid crystal panel 1 and therefore the optical transmittance of the liquid crystal panel 1 takes the minimum value. Thus, ambient light is blocked by the liquid crystal panel 1 and does not reach the cold cathode fluorescent lamp 3.

Figure 4B:
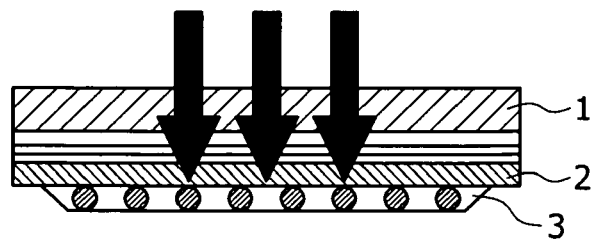

Thereafter, when the liquid crystal display device is activated, voltage is applied to the liquid crystal panel 1 and therefore the optical transmittance of the liquid crystal panel 1 is increased in the backlight irradiation period t1 before lighting of the cold cathode fluorescent lamp 3. Thus, as shown in FIG. 4B, ambient light from the display surface side of the liquid crystal panel 1 reaches the cold cathode fluorescent lamp 3. This irradiates the cold cathode fluorescent lamp 3 with the ambient light.

Figure 4C:
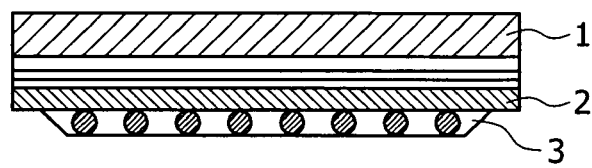
Figure 4D:
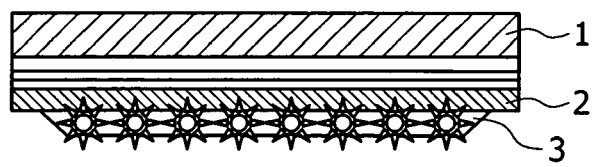

Subsequently, as shown in FIG. 4C, the desired voltage is applied to the liquid crystal panel 1 in matching with the supply of image signal data to the liquid crystal panel 1. Thereafter, as shown in FIG. 4D, the cold cathode fluorescent lamp 3 is turned on, so that the image displaying is started.

Through this series of processing operation, in this liquid crystal display device, the cold cathode fluorescent lamp 3 is irradiated with ambient light through the passage of the light through the liquid crystal panel 1 in the period from the device activation to the first lighting of the cold cathode fluorescent lamp 3. Thus, the cold cathode fluorescent lamp 3 is irradiated with light of illuminance higher than a certain level by the time of the first lighting even when the situation has occurred in which the cold cathode fluorescent lamp 3 has been left under dark environment for a long period for example. That is, the ambient light irradiation of the cold cathode fluorescent lamp 3 by use of the shutter effect of the liquid crystal panel 1 eliminates the problem of a small amount of initial electrons in the cold cathode fluorescent lamp 3. As a result, it becomes possible to activate the liquid crystal display device while eliminating lighting delay due to the in-dark start characteristic of the cold cathode fluorescent lamp 3.

The magnitude of the voltage applied to the liquid crystal panel 1 in order for the liquid crystal panel 1 to exert the shutter effect and the time of the voltage application are set to ones sufficiently large and long to obtain such ambient light illuminance as to eliminate the in-dark start characteristic of the cold cathode fluorescent lamp 3 as described. Such voltage value and application time will be set in advance based on the specification of the liquid crystal panel 1 (e.g. the correspondence relationship between the applied voltage and the optical transmittance) and experimental rules obtained through light transmission experiments and so on. That is, the drive control circuit carries out voltage application to the liquid crystal panel 1 in the backlight irradiation period t1 with a voltage value and an application time that are set in advance.

However, the ambient light illuminance differs depending on the environment under which the liquid crystal display device is placed. Therefore, although the voltage application to the liquid crystal panel 1 in the backlight irradiation period t1 with the preset voltage value and application time makes it possible to carry out the voltage application without requiring complicated control processing, a complex device configuration, and so on, the voltage application will be often carried out with an excessive voltage value or application time depending on the environment under which the liquid crystal display device is placed.

To address this problem, the voltage application to the liquid crystal panel 1 in the backlight irradiation period t1 may be carried out by utilizing a detector that detects the light amount of ambient light reaching the liquid crystal panel 1 and a controller that decides the voltage value and the application time in the voltage application to the liquid crystal panel 1 based on the detection result by the detector.

The detector will be achieved by utilizing a publicly-known technique relating to an illuminance sensor or the like provided on the panel front face of a liquid crystal display device. The controller may also be achieved by utilizing a publicly-known technique. For example, the correspondence relationship between the detection result by the detector and the voltage value and the application time in the voltage application may be set in advance, and the controller may decide the voltage value and the application time based on the set correspondence relationship.

If the voltage application to the liquid crystal panel 1 in the backlight irradiation period t1 is carried out by utilizing such a configuration, this voltage application can be carried out with necessary and sufficient voltage value and application time.

Second Embodiment

A second embodiment of the present invention will be described below.

Figure 5:
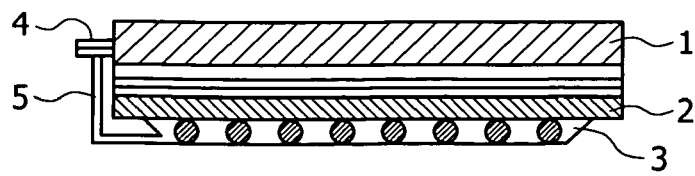
FIG. 5 is an explanatory diagram showing a schematic structural example of a liquid crystal display device according to a second embodiment of the present invention.

FIG. 5 is an explanatory diagram showing a schematic structural example of a liquid crystal display device according to the second embodiment of the present invention.

This liquid crystal display device includes a lamp light source 4 and a light guide 5 in addition to the liquid crystal panel 1, the diffuser 2, and the cold cathode fluorescent lamp 3 described above for the first embodiment. The drive control circuit (not shown) for driving the liquid crystal panel 1 may be one that does not ensure the backlight irradiation period t1 and the real video signal waiting period t2 differently from the first embodiment.

The lamp light source 4 is turned on in response to activation of the liquid crystal display device and will be formed with a light emitting diode (LED) lamp specifically. The lamp light source 4 may be one provided exclusively for light irradiation of the cold cathode fluorescent lamp 3. Alternatively, it may have also another function different from the function for the light irradiation of the cold cathode fluorescent lamp 3. Examples of another function include a function for notification of the state of the power supply to the liquid crystal display device.

The light guide 5 guides light from the lamp light source 4 to the cold cathode fluorescent lamp 3. The shape, material, and so on of the light guide 5 are not particularly limited as long as it can guide light to the cold cathode fluorescent lamp 3. Such a light guide 5 will be formed by utilizing a publicly-known technique.

In the liquid crystal display device having the above-described configuration, when the liquid crystal display device is powered on to be activated, the lamp light source 4 is also turned on. Upon the lighting of the lamp light source 4, light from the lamp light source 4 is guided to the cold cathode fluorescent lamp 3 by the light guide 5 to thereby irradiate the cold cathode fluorescent lamp 3 with the light. That is, the lamp light source 4 and the light guide 5 provide the liquid crystal display device with a function as a light irradiator that carries out light irradiation of the cold cathode fluorescent lamp 3 in the period from the device activation to the first lighting of the cold cathode fluorescent lamp 3. The light amount of the lighting of the lamp light source 4 and the amount of light guided by the light guide 5 (the light amount resulting from optical loss) are set to ones sufficiently large to obtain such light illuminance as to eliminate the in-dark start characteristic of the cold cathode fluorescent lamp 3.

By this configuration, in this liquid crystal display device, the cold cathode fluorescent lamp 3 is irradiated with light due to the lighting of the lamp light source 4 in the period from the device activation to the first lighting of the cold cathode fluorescent lamp 3. Thus, the cold cathode fluorescent lamp 3 is irradiated with light of illuminance higher than a certain level by the time of the first lighting even when the situation has occurred in which the cold cathode fluorescent lamp 3 has been left under dark environment for a long period for example. That is, the light irradiation of the cold cathode fluorescent lamp 3 by use of the lighting of the lamp light source 4 eliminates the problem of a small amount of initial electrons in the cold cathode fluorescent lamp 3. As a result, it becomes possible to activate the liquid crystal display device while eliminating lighting delay due to the in-dark start characteristic of the cold cathode fluorescent lamp 3.

As described above, the light amount of the lighting of the lamp light source 4 and the amount of light guided by the light guide 5 (the light amount resulting from optical loss) are set to ones sufficiently large to obtain such light illuminance as to eliminate the in-dark start characteristic of the cold cathode fluorescent lamp 3. It is very easy to obtain such light amounts if the lamp light source 4 is provided exclusively for the light irradiation of the cold cathode fluorescent lamp 3. On the other hand, even if the lamp light source 4 is provided also for another function different from the function of the light irradiation of the cold cathode fluorescent lamp 3, the lamp light source 4 can have both this different function and the function of the light irradiation of the cold cathode fluorescent lamp 3 as long as the above-described light amounts can be achieved. If the lamp light source 4 has the respective functions, the device configuration can be simplified compared with the case of providing the lamp light source 4 exclusively for the light irradiation of the cold cathode fluorescent lamp 3.

In the above description of the first and second embodiments, specific examples of preferred embodiments of the present invention are explained. However, the present invention is not limited thereto but can be accordingly changed without departing from the gist thereof.

For example, the liquid crystal display devices described for the first and second embodiments will be used as television devices. In addition, they can be used for monitor devices of desktop personal computers, notebook personal computers, imaging devices such as video cameras and digital still cameras having a liquid crystal display device, PDAs (personal digital assistants), and cellular phones, of course. Moreover, they can be widely used for various kinds of electronic apparatus having a liquid crystal display device.

It should be understood by those skilled in the art that various modifications, combinations, sub-combinations and alternations may occur depending on design requirements and other factors insofar as they are within the scope of the appended claims or the equivalent thereof.

The invention claimed is:

1. A liquid crystal display device comprising:
a normally-black liquid crystal panel whose transmittance takes a minimum value when no voltage is applied;
a cold cathode fluorescent lamp used as a light source of a backlight of the liquid crystal panel; and
light irradiating means for carrying out light irradiation of the cold cathode fluorescent lamp in a period from device activation to first lighting of the cold cathode fluorescent lamp, in which the period includes a first sub-period and a second sub-period and in which the light irradiating means causes a first voltage to be applied to the liquid crystal panel during the first sub-period and causes a second voltage to be applied to the liquid crystal panel during the second sub-period, said second voltage being less than said first voltage.

2. The liquid crystal display device according to claim 1, wherein a voltage value and an application time associated therewith are set in advance.

3. The liquid crystal display device according to claim 1, wherein the light irradiating means has detecting means that detects a light amount of ambient light reaching the liquid crystal panel and controlling means that decides a voltage value and an application time in voltage application to the liquid crystal panel based on a detection result by the detecting means.

4. The liquid crystal display device according to claim 1, wherein the light irradiating means has a lamp light source that is turned on in response to device activation and a light guide that guides light from the lamp light source to the cold cathode fluorescent lamp.

5. The liquid crystal display device according to claim 4, wherein the lamp light source is provided exclusively for light irradiation of the cold cathode fluorescent lamp.

6. The liquid crystal display device according to claim 4, wherein the lamp light source has also another function different from a function for light irradiation of the cold cathode fluorescent lamp.

7. A method for driving a liquid crystal display device that includes a normally-black liquid crystal panel whose transmittance takes a minimum value when no voltage is applied and a cold cathode fluorescent lamp used as a light source of a backlight of the liquid crystal panel, the method comprising the step of
carrying out light irradiation of the cold cathode fluorescent lamp in a period from device activation to first lighting of the cold cathode fluorescent lamp, in which the period includes a first sub-period and a second sub-period and in which the carrying step causes a first voltage to be applied to the liquid crystal panel during the first sub-period and causes a second voltage to be applied to the liquid crystal panel during the second sub-period, said second voltage being less than said first voltage.

8. A liquid crystal display device that includes a normally-black liquid crystal panel whose transmittance takes a minimum value when no voltage is applied and a cold cathode fluorescent lamp used as a light source of a backlight of the liquid crystal panel, the liquid crystal display device comprising
a light irradiator configured to carry out light irradiation of the cold cathode fluorescent lamp in a period from device activation to first lighting of the cold cathode fluorescent lamp, in which the period includes a first sub-period and a second sub-period and in which the light irradiator causes a first voltage to be applied to the liquid crystal panel during the first sub-period and causes a second voltage to be applied to the liquid crystal panel during the second sub-period, said second voltage being less than said first voltage.

* * * * *